United States Patent
Gohara

(10) Patent No.: US 10,259,393 B2
(45) Date of Patent: Apr. 16, 2019

(54) MIRROR DISPLAY DEVICE

(71) Applicant: MURAKAMI CORPORATION, Shizuoka (JP)

(72) Inventor: Yoshihiro Gohara, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 15/982,233

(22) Filed: May 17, 2018

(65) Prior Publication Data

US 2018/0345866 A1 Dec. 6, 2018

(30) Foreign Application Priority Data

May 30, 2017 (JP) .................. 2017-107115

(51) Int. Cl.
*B60R 1/08* (2006.01)
*B60R 1/12* (2006.01)
*G02F 1/1335* (2006.01)

(52) U.S. Cl.
CPC ................ *B60R 1/12* (2013.01); *B60R 1/088* (2013.01); *G02F 1/133528* (2013.01); *G02F 1/133553* (2013.01); *B60R 2001/1215* (2013.01)

(58) Field of Classification Search
CPC ..... B60R 1/088; B60R 1/12; G02F 1/133553; G02F 1/133528
See application file for complete search history.

(56) References Cited

FOREIGN PATENT DOCUMENTS

| JP | 3-243914 | 10/1991 |
| JP | 2009-8881 | 1/2009 |

*Primary Examiner* — Thomas M Sember
(74) *Attorney, Agent, or Firm* — Greenblum & Bernstein, P.L.C.

(57) ABSTRACT

Provided is a mirror display device including a monitor display element for emitting image light vibrating in a first direction in an image display state; and a mirror optical element provided on the display surface side relative to the monitor display element. The mirror optical element can switch reflective and transmissible states. The reflective state is that light vibrating in a first direction from an absorption-type polarization plate side is converted to vibrate in a second direction by a liquid crystal cell to be reflected by a reflection-type polarization plate, and converted to vibrate in the first direction by the liquid crystal cell to be emitted from the absorption-type polarization plate. The transmissible state is that light vibrating in the first direction from a reflection-type polarization plate side is transmitted through the cell as it is, to be emitted from the absorption-type polarization plate.

14 Claims, 16 Drawing Sheets

MIRROR DISPLAY DEVICE

CROSS REFERENCE TO RELATED APPLICATIONS

This application claims the foreign priority benefit under Title 35, United States Code, 119 (a)-(d) of Japanese Patent Application No. 2017-107115, filed on May 30, 2017 in the Japan Patent Office, the disclosure of which is herein incorporated by reference in its entirety.

BACKGROUND OF THE INVENTION

1. Technical Field

The present invention relates to a mirror display device capable of switching a mirror state and an image display state to display an image.

2. Description of Background Art

A rearview mirror for a vehicle is provided inside or outside a vehicle in order to observe the state behind the vehicle, and provided in the posture in which the mirror surface of the rearview mirror is directed rearward. While a vehicle is running at night, there is a case in which the driver of the vehicle feels dazzle since light from head lamps of a rear vehicle enters the mirror surface to be reflected. Therefore, as a rearview mirror for a vehicle, one having a function for preventing dazzle is used.

An anti-dazzle mirror capable of displaying an image thereon is disclosed in the patent document 1. This mirror is provided with a liquid crystal cell having electrodes forming pixels, a half mirror disposed behind the liquid crystal cell, a back light device disposed behind the half mirror, and an electrode driving device for the liquid crystal cell.

Since this anti-dazzle mirror uses a half mirror, the light amount becomes approximately half in both cases of transmission and reflection. Thus, there has been a problem that the screen is dark when an image is displayed.

On the contrary, a liquid crystal anti-dazzle mirror which can be used as a monitor when the power source is ON and as a mirror when the power source is OFF, is disclosed in the patent document 2. This liquid crystal anti-dazzle mirror includes a reflection-type polarization plate for reflecting incident light, a liquid crystal part disposed on the front surface side of the reflection-type polarization plate, and an absorption-type polarization plate (called also as a transmission-type polarization plate) disposed on the front surface side of the liquid crystal part.

Patent document 1: JP H3-243914, A
Patent document 2: JP 2009-8881, A

BRIEF SUMMARY OF THE INVENTION

However, the patent document 2 does not concretely disclose the structures of a monitor display element and a mirror optical element. That is, though transmittance of the liquid crystal part of TN (Twisted Nematic) type of the liquid crystal anti-dazzle mirror disclosed in the patent document 2 differs according to viewing directions, the liquid crystal anti-dazzle mirror disclosed in the patent document 2 is not made considering that thing. Therefore, the liquid crystal anti-dazzle mirror disclosed in the patent document 2 may not sufficiently exhibit display characteristics of the monitor display element.

The present invention is created considering the above problems, and an object of the present invention is to provide a mirror display device capable of suitably exhibiting display characteristics of the monitor display element.

To solve the above problems, one aspect of the present invention provides a mirror display device comprising:

a monitor display element for emitting polarized light which is image polarized light vibrating in a first direction in an image display state; and a mirror optical element including:

a reflection-type polarization plate for transmitting the polarized light vibrating in the first direction and reflecting polarized light vibrating in a second direction orthogonal to the first direction, the reflection-type polarization plate being provided on a display surface side of the mirror display device relative to the monitor display element;

an absorption-type polarization plate for transmitting the polarized light vibrating in the first direction and absorbing the polarized light vibrating in the second direction, the absorption-type polarization plate being provided on the display surface side relative to the reflection-type polarization plate; and a liquid crystal cell provided between the reflection-type polarization plate and the absorption-type polarization plate, wherein the mirror optical element is configured to be capable of switching a reflective state and a transmissible state, the reflective state being a state in which the polarized light vibrating in the first direction coming from a side of the absorption-type polarization plate is converted to the polarized light vibrating in the second direction by the liquid crystal cell to be reflected by the reflection-type polarization plate and converted to vibrate in the first direction by the liquid crystal cell to be emitted from the absorption-type polarization plate, and the transmissible state being a state in which the polarized light vibrating in the first direction coming from a side of the reflection-type polarization plate transmits through the liquid crystal cell while vibrating in the first direction to be emitted from the absorption-type polarization plate, and wherein a priority transmission direction of the mirror optical element is set according to a viewing direction of a user.

Display characteristics of the monitor display element can be suitably exhibited by the present invention.

BRIEF DESCRIPTION OF THE SEVERAL VIEWS OF THE DRAWINGS

Certain embodiments of the present invention will now be described in greater detail, by way of example only, and with reference to the attached drawings, in which.

DETAILED DESCRIPTION OF THE INVENTION

A mirror device according to an embodiment of the present invention will be described in detail with reference to Figures, as an example of a case in which the mirror display device is applied to a room mirror (or an inner rear view mirror) installed at a front part of a cabin of a vehicle. The same element has the same reference symbol, and the duplicated explanation is omitted. In the description, directions of front, rear, upper, lower, left, and right are based on a vehicle driver (hereinafter, "a driver" is used).

Mirror display devices according to first and third embodiments are common on a point of acting as a mirror in a voltage-non-applied state (a non-energized state). Mirror display devices according to second and fourth embodiments are common on a point of acting as a mirror in a voltage-applied state (an energized state). Mirror display devices according to the first and the second embodiments are common on a point that a priority transmission direction thereof to be described later is set to a right lower direction or a left lower direction. Mirror display devices according to the third and the fourth embodiments are common on a point that a priority transmission direction thereof is set to a vertically downward direction. In a mirror display device according to each embodiment, a vibration direction of the image polarized light which is emitted from a monitor display element, that is, a direction of a light transmission axis of an absorption-type polarization plate 54, is a "first direction" of CLAIMS.

First Embodiment

Figure 1:
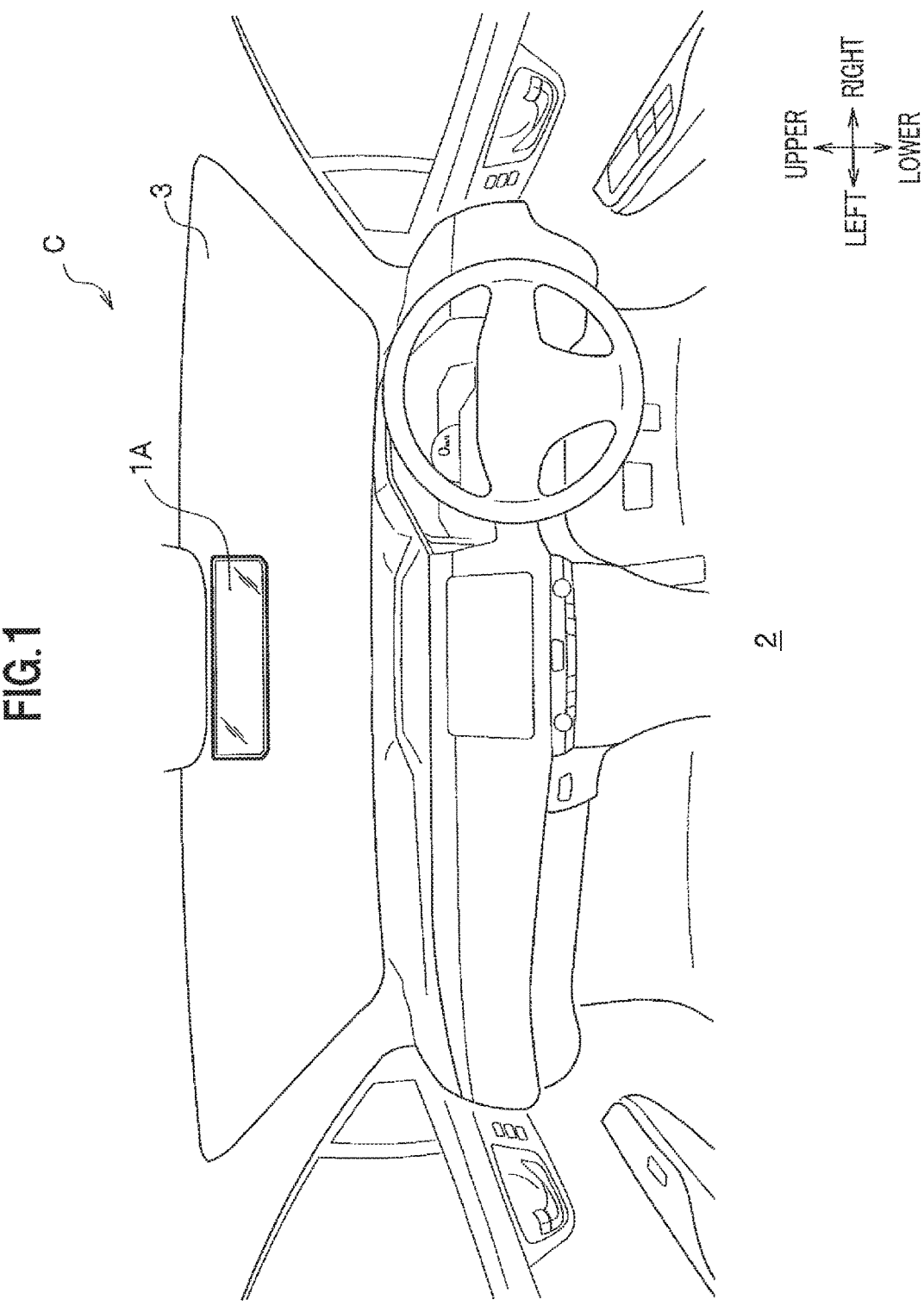
FIG. 1 is a schematic view showing an installed state of a mirror display device according to a first embodiment of the present invention.
Figure 7:
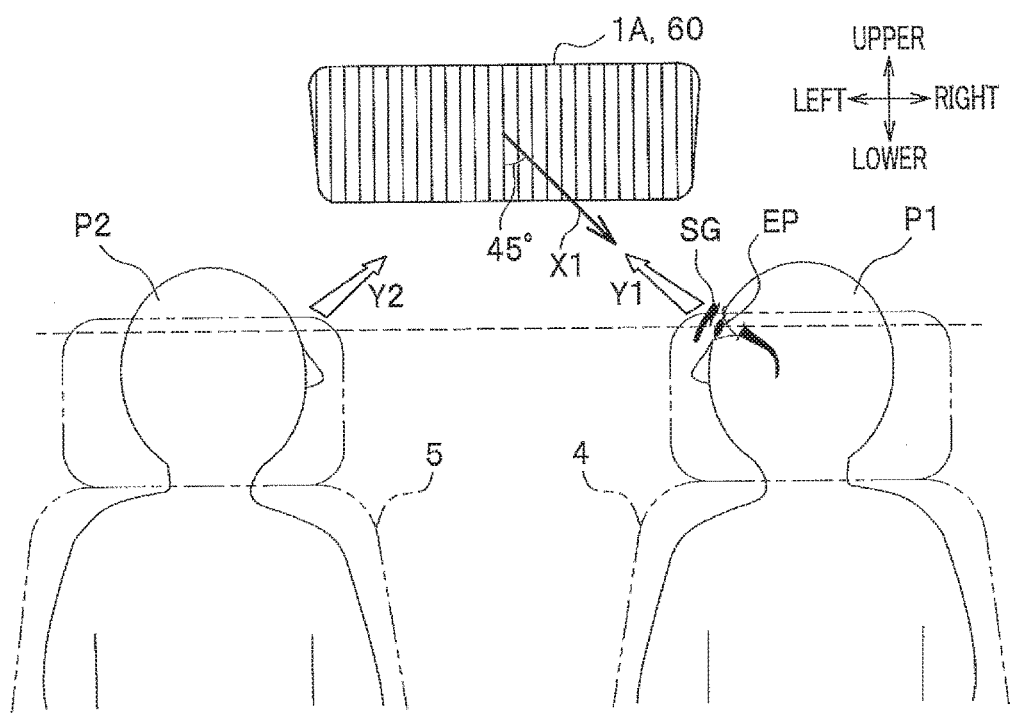
FIG. 7 is a view showing a relation between a viewing direction and a priority transmission direction in the mirror display device according to the first embodiment of the present invention.

As shown in FIG. 1, a mirror display device 1A according to a first embodiment of the present invention is installed at a front part of a cabin 2 of a vehicle C to secure a rear view of a driver P1 (refer to FIG. 7). The mirror display device 1A is installed so that a display surface thereof is directed rearward. The mirror display device 1A can switch a mirror state acting as a rear view mirror and an image display state displaying an image. In this embodiment, the mirror display device 1A is installed at an upper end part of a front window shield (a front glass) 3 in the middle of a vehicle's width. That is, the mirror display device 1A is installed at an upper and forward position than an eye point EP of a standard eye point of the driver P1 (refer to FIG. 7).

Figure 2:
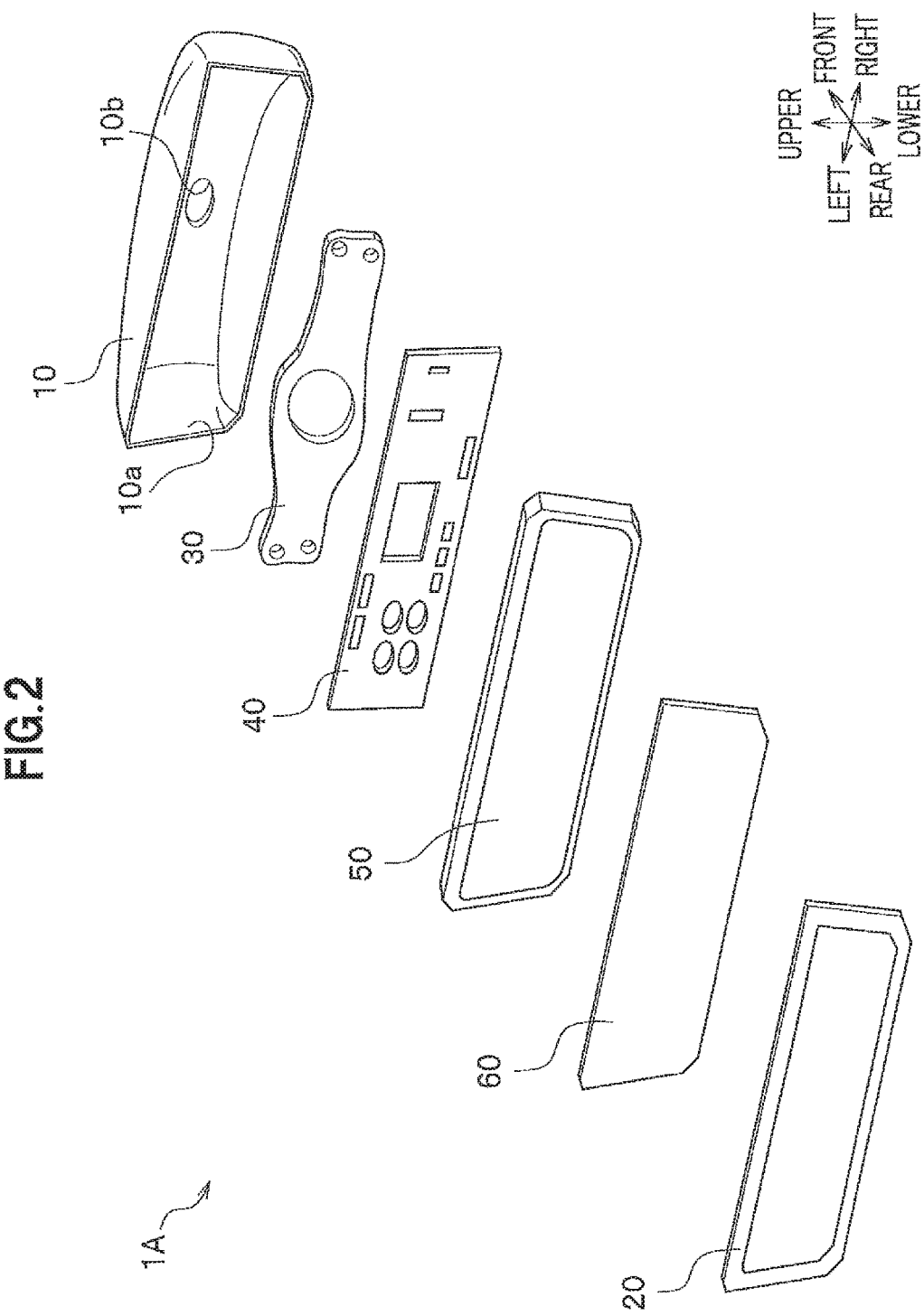
FIG. 2 is an exploded perspective view showing the mirror display device according to the first embodiment of the present invention.

As shown in FIG. 2, the mirror display device 1A includes an outer case 10, a front bezel 20, a structure support member 30, a control circuit board 40, a monitor display element 50, and a mirror optical element 60.

<Outer Case>

The outer case 10 is a plastic or metallic member having a housing shape with an opening 10a facing rearward. A hole 10b, which a cable not shown is inserted into, is formed in a front wall of the outer case 10. The outer case 10 is fixed to the structure support member 30 with screws or the like. In the outer case 10, the structure support member 30, the control circuit board 40, the monitor display element 50, and the mirror optical element 60 are housed sequentially from the front side. Shapes of the monitor display element 50 and the mirror optical element 60 are fitted to the shape of the opening 10a.

<Front Bezel>

The front bezel 20 is a plastic member having a rectangular shape to seal a peripheral edge of the opening 10a of the outer case 10. The front bezel 20 covers peripheral edges of the monitor display element 50 and the mirror optical element 60 from the rear side. Note that, the front bezel 20 can be omitted.

<Structure Support Member>

The structure support member 30 is a metallic or plastic member which fixes the control circuit board 40 and the monitor display element 50 (and the mirror optical element 60) and supports the whole of the mirror display device 1A. The structure support member 30 is attached to a structural member (not shown) of the vehicle C through the hole 10b.

<Control Circuit Board>

The control circuit board 40 is structured by equipping electronic components such as CPU (Central Processing Unit), ROM (Read Only Memory), RAM (Random Access Memory), and I/O unit (Input Output unit). The control circuit board 40 controls the monitor display element 50 and the mirror optical element 60. For example, the control circuit board 40 can make the monitor display element 50 display a photographic result with use of a camera which photographs a dead area on the front or rear side of the vehicle C. Furthermore, the control circuit board 40 may make the monitor display element 50 display an image stored in a recording medium such as a DVD, an image from a car navigation device, an image of one segment broadcast, or the like. And the control circuit board 40 may make the monitor display element 50 display various information such as a state of the vehicle C (vehicle velocity or the like), a present time, a present location, an air temperature, a room temperature. And furthermore, the control circuit board 40 can select an image to be displayed on the monitor display element 50 based on operational results of switches provided on the vehicle C, sensed results of various kind of sensors provided on the vehicle C, and so on.

<Monitor Display Element>

Figure 3:
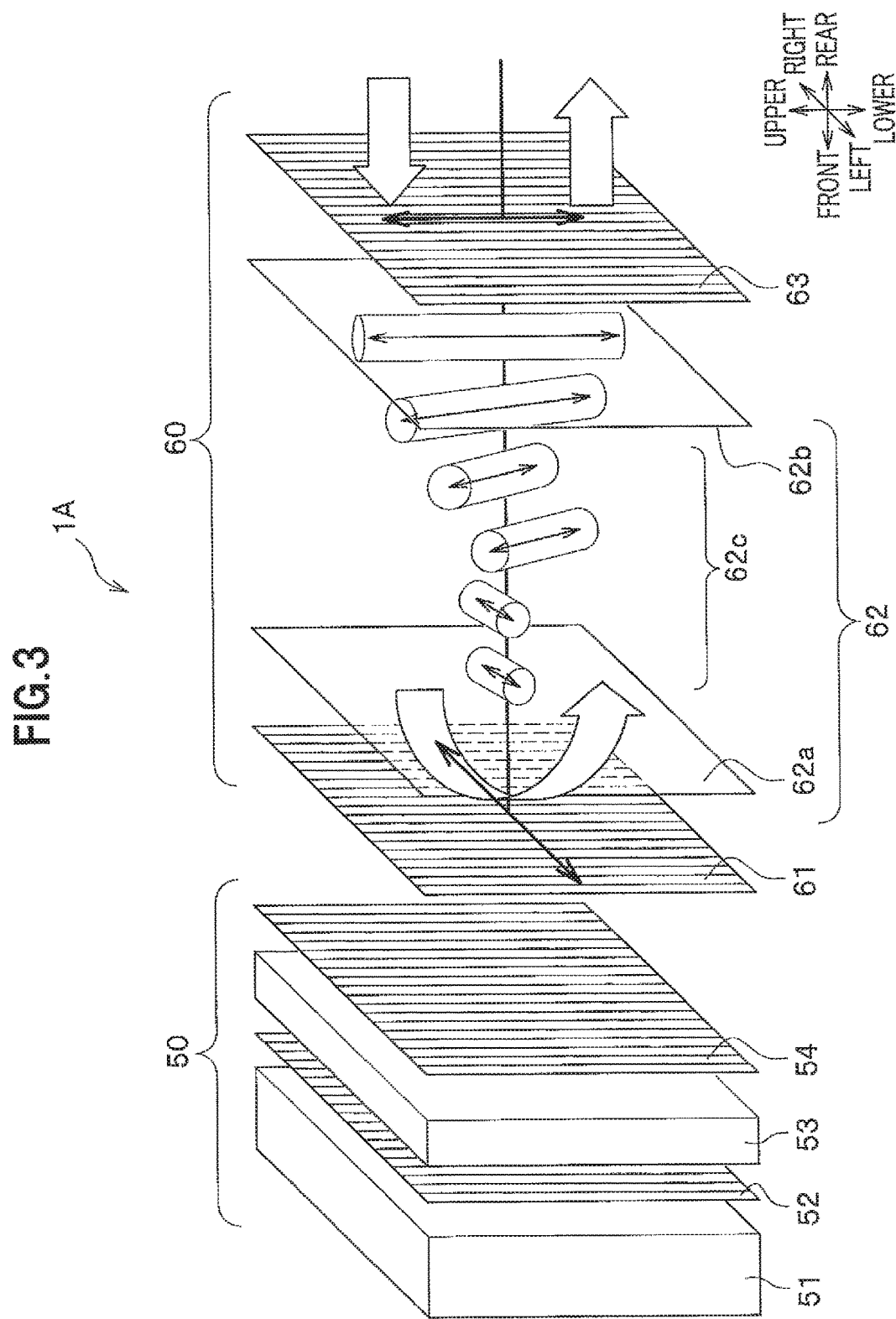
FIG. 3 is a schematic view showing a mirror state of the mirror display device according to the first embodiment of the present invention.
Figure 4:
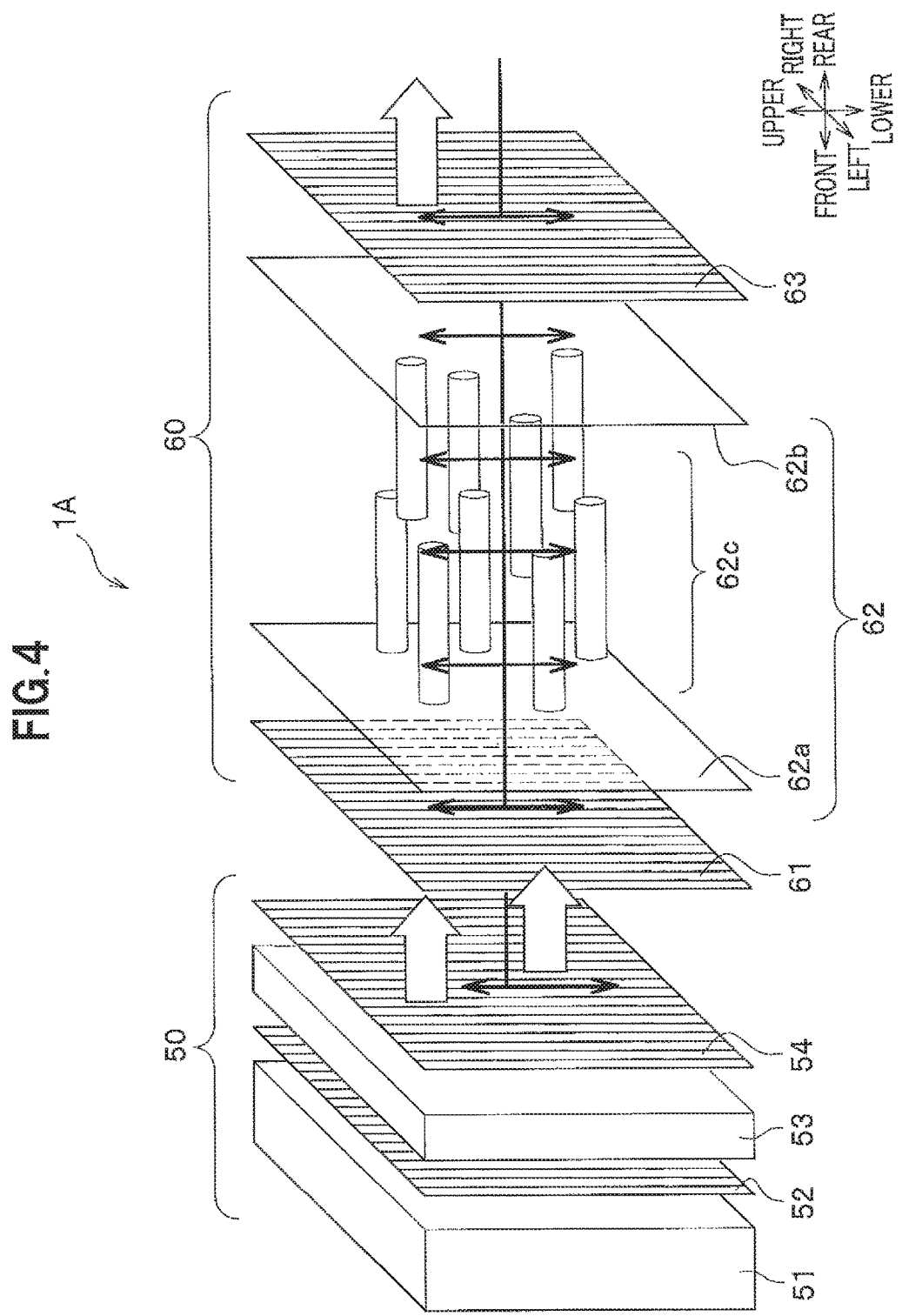
FIG. 4 is a schematic view showing an image display state of the mirror display device according to the first embodiment of the present invention.

The monitor display element 50 emits image polarized light for displaying an image rearward from a display surface (rear surface) of the monitor display element 50 according to the control of the control circuit board 40. In this embodiment, the image polarized light is the polarized light vibrating in an upper-lower direction. As shown in FIGS. 3, 4, the monitor display element 50 includes a backlight 51, an absorption-type polarization plate 52, a liquid crystal cell 53, and an absorption-type polarization plate 54 sequentially from the front side.

<Backlight>

The backlight 51 is a surface light source of white color light, and can switch a lighting state and a light-out state according to the control of the control circuit board 40. In the lighting state, the backlight 51 emits white color light rearward.

<Absorption-Type Polarization Plate>

The absorption-type polarization plate 52 is provided on a rear surface (a lighting surface) of the backlight 51. That is, the absorption-type polarization plate 52 is provided behind the backlight 51. The absorption-type polarization plate 52 can transmit the polarized light vibrating in the upper-lower direction (for example, a vertical direction) through itself, and absorb the polarized light vibrating in the left-right direction (for example, a horizontal direction) orthogonal to the upper-lower direction. That is, the light transmission axis of the absorption-type polarization plate 52 is set to be in the upper-lower direction. Note that, the absorption of light and the shutting off light in each absorption-type polarization plate 52, 54, 63 are not limited to that the vibrating polarized light is absorbed or shut off by 100%. For example, transmission up to around 10% is allowed.

<Liquid Crystal Cell>

The liquid crystal cell 53 is provided on a rear surface of the absorption-type polarization plate 52. That is, the liquid crystal cell 53 is provided behind the absorption-type polarization plate 52. The liquid crystal cell 53 is divided into a plurality of pixels, and emits image polarized light for displaying an image with use of the white color light emitted from the backlight 51. The liquid crystal cell 53 can switch a transmissible state of transmitting the polarized light vibrating in the upper-lower direction and a shutting off state of shutting off the polarized light vibrating in the upper-lower direction according to the control of the control circuit board 40, for each pixel.

As the liquid crystal cell 53, an IPS (In-Plane-Switching) type liquid crystal cell, a VA (Vertical Alignment) type liquid crystal cell or the like can be suitably used. In a case where the liquid crystal cell 53 is the IPS type one, the liquid crystal cell 53 shuts off light in a voltage-non-applied state, and transmits light in a voltage-applied state. In also a case where the liquid crystal cell 53 is the VA type one, the liquid crystal cell 53, in the same way as the IPS type one, shuts off light in a voltage-non-applied state, and transmits light in a voltage-applied state. Differing from a liquid crystal cell 62 of a TN (Twisted Nematic) type one to be described later, the VA type or IPS type liquid crystal cell 53 realizes suitable light transparency for every viewing direction. In this embodiment, the liquid crystal cell 53 is an IPS type one.

<Absorption-Type Polarization Plate>

The absorption-type polarization plate 54 is provided on a rear surface of the liquid crystal cell 53. That is, the absorption-type polarization plate 54 is provided behind the liquid crystal cell 53. The absorption-type polarization plate 54 transmits the polarized light vibrating in the upper-lower direction through itself, and absorbs the polarized light vibrating in the left-right direction orthogonal to the upper-lower direction. That is, the light transmission axis of the absorption-type polarization plate 54 is set to the upper-lower direction in the same way as the absorption-type polarization plate 52.

<Switching of Image Display State and Image Non-Display State by Monitor Display Element>

In a normal state (the backlight 51 is in a light-out state and the liquid crystal cell 53 is in a voltage-non-applied state) that the mirror display device 1A is used as a rearview mirror, the monitor display element 50 is in an image non-display state of displaying no image.

Furthermore, the monitor display element 50 becomes to be an image display state of displaying an image when the backlight 51 is in a lighting state and the liquid crystal cell 53 is in a voltage-applied state. In the image display state, the polarized light vibrating in the upper-lower direction of the light emitted from the backlight 51 is emitted to the mirror optical element 60 through the absorption-type polarization plate 52, the liquid crystal cell 53, and the absorption-type polarization plate 54.

Note that, in the monitor display element 50 including the IPS type or VA type liquid crystal cell 53, an installation aspect of each absorption-type polarization plate 52, 54 is not limited to the above-described one. That is, the monitor display element 50 has only to be one which emits the polarized light vibrating in the upper-lower direction to the mirror optical element 60 as image light.

<Mirror Optical Element>

As shown in FIG. 2, the mirror optical element 60 is provided on the display surface (rear surface) side of the monitor display element 50, and can electrically switch a reflective state and a transmissible state according to the control of the control circuit board 40. The mirror optical element 60 may be adhered to the monitor display element 50 with the intervention of the optical coupling resin, tape, or the like, or may be provided with a gap from the monitor display element 50. As shown in FIGS. 3 and 4, the mirror optical element 60 includes a reflection-type polarization plate 61, a liquid crystal cell 62, and the absorption-type polarization plate 63 sequentially from the front side.

<Reflection-Type Polarization Plate>

The reflection-type polarization plate 61 is provided on the display surface side of the monitor display element 50, that is, on the rear surface side of the absorption-type polarization plate 54. The reflection-type polarization plate 61 transmits the polarized light vibrating in the upper-lower direction through itself, and reflects the polarized light vibrating in the left-right direction orthogonal to the upper-lower direction. That is, the light transmission axis of the reflection-type polarization plate 61 is set to the upper-lower direction. Note that, the light reflection in the reflection-type polarization plate 61 is not limited to reflecting of the polarized light vibrating in the upper-lower direction by 100%, and for example, transmission or absorption of light up to around 10% is allowed.

<Liquid Crystal Cell>

The liquid crystal cell 62 is provided on the rear surface (display surface side) of the reflection-type polarization plate 61. That is, the liquid crystal cell 62 is provided behind the reflection-type polarization plate 61. The liquid crystal cell 62 is a TN (Twisted Nematic) type one, and includes a pair of front and rear transparent substrates (for example, glass members) 62a, 62b, and liquid crystals 62c sealed between the transparent base members 62a, 62b. As shown in FIG. 3, the liquid crystals 62c are spirally arranged so as to be twisted by 90 degrees from the transparent base member 62a to the other transparent base member 62b by so-called rubbing processing.

As shown in FIG. 3, the liquid crystals 62c have optical rotatory in a voltage-non-applied state. That is, the liquid crystals 62c, in a voltage-non-applied state, convert the polarized light vibrating in the upper-lower direction coming from the absorption-type polarization plate 63 side into the polarized light vibrating in the left-right direction while the polarized light vibrating in the upper-lower direction is transmitted through them toward the reflection-type polarization plate 61. Furthermore, the liquid crystals 62c, in a voltage-non-applied state, convert the polarized light vibrating in the left-right direction reflected by the reflection-type polarization plate 61 and coming from the reflection-type polarization plate 61 side into the polarized light vibrating in the upper-lower direction while the polarized light vibrating in the left-right direction is transmitted through them toward the absorption-type polarization plate 63 side.

As shown in FIG. 4, the optical rotatory of the liquid crystals 62c, in a voltage-applied state, is dissolved by changing the arrangement of liquid crystal molecules. That is, the liquid crystals 62c, in a voltage-applied state, permit the transmission of the polarized light vibrating in the upper-lower direction.

Note that, directions of molecules of the liquid crystals 62c shown in FIGS. 3, 4 are schematically showed. That is, they do not show directions of actual molecules precisely (similar also in other Figures). Furthermore, parallel lines (striped pattern) drawn on each polarization plate 52, 54, 61, 63 in FIGS. 3, 4 show the direction of the light transmission axis of the corresponding polarization plate 52, 54, 61, 63 (similar also in FIGS. 8 to 11, 15, 16 showing the other embodiments).

<Absorption-Type Polarization Plate>

As shown in FIGS. 3, 4, the absorption-type polarization plate 63 is provided on a rear surface (on the display surface side) of the liquid crystal cell 62. That is, the absorption-type polarization plate 63 is provided behind the liquid crystal cell 62. The absorption-type polarization plate 63 transmits the polarized light vibrating in the upper-lower direction through itself, and absorbs the polarized light vibrating in the left-right direction orthogonal to the upper-lower direction. That is, the light transmission axis of the absorption-type polarization plate 63 is set to the upper-lower direction.

<Switching Reflective State and Transmissible State of Mirror Optical Element>

As shown in FIG. 3, the mirror optical element 60 is a reflective state in a normal state (the liquid crystal cell 62 is in a voltage-non-applied state). In the reflective state, the polarized light vibrating in the upper-lower direction coming from the absorption-type polarization plate 63 side is converted into the polarized light vibrating in the left-right direction while the polarized light vibrating in the upper-lower direction is transmitted in the liquid crystal cell 62 to be reflected by the reflection-type polarization plate 61, and then the polarized light vibrating in the left-right direction is converted into the polarized light vibrating in the upper-lower direction while the polarized light vibrating in the left-right direction is transmitted in the liquid crystal cell 62 to be emitted from the absorption-type polarization plate 63.

Furthermore, in the reflective state, the polarized light vibrating in the left-right direction coming from the rear side of the absorption-type polarization plate 63 is absorbed by the absorption-type polarization plate 63. In the reflective state, the polarized light vibrating in the upper-lower direction coming from the front side of the reflection-type polarization plate 61 is transmitted through the reflection-type polarization plate 61 to be converted into the polarized light vibrating in the left-right direction while the polarized light vibrating in the upper-lower direction is transmitted in the liquid crystal cell 62 to be shut off by the absorption-type polarization plate 63.

In this way, in the reflective state, the light coming from the front side of the reflection-type polarization plate 61 cannot be transmitted through the mirror optical element 60, so that it is not emitted rearward. Therefore, even if the monitor display element 50 emits any image light, the mirror optical element 60 suitably acts as a mirror.

As shown in FIG. 4, the mirror optical element 60 becomes to be a transmissible state when voltage is applied to the liquid crystal cell 62. In the transmissible state, the polarized light vibrating in the upper-lower direction can be transmitted through the mirror optical element 60 in both directions (the direction from the reflection-type polarization plate 61 side and the direction from the absorption-type polarization plate 63 side). Furthermore, in the transmissible state, the polarized light vibrating in the left-right direction coming from the absorption-type polarization plate 63 side is absorbed by the absorption-type polarization plate 63.

WORKING EXAMPLE

Next, a working example of the mirror display device 1A according to the first embodiment of the present invention will be explained in order of a mirror state, an image display state.

<Mirror State>

As shown in FIG. 3, in a mirror state, the control circuit board 40 puts out the backlight 51 of the monitor display element 50, and does not apply voltage to the liquid crystal cell 53 of the monitor display element 50 and the liquid crystal cell 62 of the mirror optical element 60.

In this state, the polarized light vibrating in the left-right direction of an external light which is incident on the rear surface of the absorption-type polarization plate 63 of the mirror optical element 60 is absorbed by the absorption-type polarization plate 63, and the polarized light vibrating in the upper-lower direction of the external light is transmitted through the absorption-type polarization plate 63. The polarized light vibrating in the upper-lower direction transmitted through the absorption-type polarization plate 63 is converted into the polarized light vibrating in the left-right direction by the liquid crystal cell 62 while the polarized light vibrating in the upper-lower direction is transmitted forward in the liquid crystal cell 62. The polarized light converted to vibrate in the left-right direction by the liquid crystal cell 62 is reflected by the reflection-type polarization plate 61. The light reflected by the reflection-type polarization plate 61 is converted into the polarized light vibrating in the upper-lower direction by the liquid crystal cell 62 while the light reflected by the reflection-type polarization plate 61 is transmitted rearward in the liquid crystal cell 62. The polarized light converted to vibrate in the upper-lower direction by the liquid crystal cell 62 is transmitted through the absorption-type polarization plate 63 to be emitted rearward.

That is, in the mirror state, the mirror optical element 60 of the mirror display device 1A acts as a mirror for reflecting the polarized light vibrating in the upper-lower direction of light coming from the rear.

<Image Display State>

As shown in FIG. 4, in an image display state, the control circuit board 40 puts on the backlight 51 of the monitor display element 50, and applies voltage to the liquid crystal cell 53 of the monitor display element 50 and the liquid crystal cell 62 of the mirror optical element 60. Furthermore, the liquid crystal cell 53 is actually controlled about whether or not voltage is applied to each pixel thereof. In the following, the state of pixels to which voltage is applied will be explained.

In this state, the polarized light vibrating in the left-right direction of the light emitted from the backlight 51 is absorbed by the absorption-type polarization plate 52, and the polarized light vibrating in the upper-lower direction is transmitted through the absorption-type polarization plate 52. The polarized light vibrating in the upper-lower direction transmitted through the absorption-type polarization plate 52 is transmitted through the liquid crystal cell 53 as it is (as the polarized light vibrating in the upper-lower direction). The polarized light vibrating in the upper-lower direction transmitted through the liquid crystal cell 53 is transmitted through the absorption-type polarization plate 54.

Furthermore, the polarized light vibrating in the upper-lower direction transmitted through the absorption-type polarization plate 54 is transmitted through the reflection-type polarization plate 61 of the mirror optical element 60. The polarized light vibrating in the upper-lower direction transmitted through the reflection-type polarization plate 61 is transmitted through the liquid crystal cell 62 as it is (as the polarized light vibrating in the upper-lower direction). The polarized light vibrating in the upper-lower direction transmitted through the liquid crystal cell 62 is transmitted through the absorption-type polarization plate 63 to be emitted rearward.

That is, in the image display state, the mirror optical element 60 of the mirror display device 1A acts as a light transmission layer for transmitting the light of an image displayed by the monitor display element 50 therethrough.

<Relation Between Priority Transmission Direction and Viewing Direction>

Figure 5:
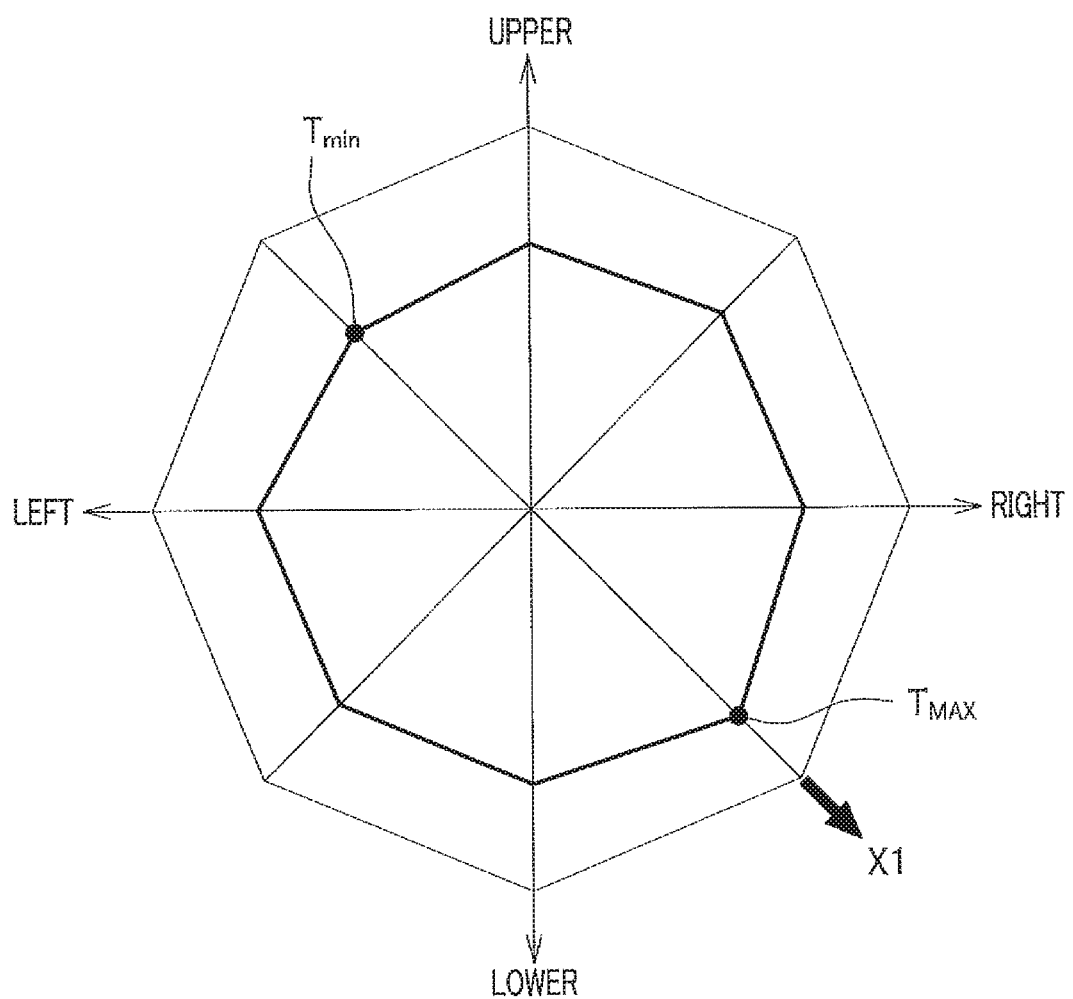
FIG. 5 is a view explaining transmittance of a mirror optical element according to the first embodiment of the present invention.

As shown in FIG. 3, the TN type mirror optical element 60 in the voltage-non-applied state causes twisting of the arrangement of liquid crystal molecules in the liquid crystal cell 62 by both alignment films. These alignment films are provided on the respective transparent substrates 62a, 62b. One alignment film is provided on a surface of the transparent substrate 62a, the surface being on the reflection-type polarization plate 61 side. The other alignment film is provided on a surface of the transparent substrate 62b, the surface being on the absorption-type polarization plate 63 side. Therefore, as shown in FIG. 5, transmittances differ according to directions viewing the mirror optical element 60. Here, the direction in which transmittance is the largest among directions on the surface of the mirror optical element 60, namely which has the maximum transmittance value $T_{MAX}$, is set to the priority transmission direction X1. In other word, the direction opposite to the direction in which transmittance is the smallest, namely which has the minimum transmittance value $T_{min}$, is set to the priority transmission direction X1. The priority transmission direction X1 is determined by the direction of the above-mentioned rubbing processing. The priority transmission direction X1 is a direction of 45 degrees on the surface (surface including the upper-lower direction and the left-right direction and orthogonal to the front-rear direction) of the mirror optical element 60, the direction of 45 degrees being relative to the direction of the light transmission axis (here, the vertical direction) of the reflection-type polarization plate 61 and the absorption-type polarization plate 63.

The priority transmission direction X1 of the mirror display device 1A according to the first embodiment of the present invention is set to the right lower direction (the direction of 45 degrees to the right relative to the vertical direction directed downward) or the left lower direction (the direction of 45 degrees to the left relative to the vertical direction directed downward). It is preferable that the priority transmission direction X1 is set to a direction toward the driver's seat 4 (refer to FIG. 7) of the left lower direction and the right lower direction.

The rate of change on the surface of the mirror optical element 60 in transmittance of the mirror optical element 60 according to a viewing direction is small in the neighborhood of the priority transmission direction X1, and becomes larger as it goes away from the priority transmission direction X1. That is, transmittance of the mirror optical element 60 is roughly the same in the neighborhood of the priority transmission direction X1, and the transmittance becomes smaller and the rate of change in the transmittance becomes larger as it goes away from the priority transmission direction X1.

Here, in a case where the mirror display device 1A is designed so that the priority transmission direction X1 of the mirror optical element 60 is directed toward the driver's seat 4 of a right-hand drive vehicle in order to give priority to a right-hand drive vehicle, there may be a case where the mirror display device 1A is applied to a left-hand drive vehicle. In such a case, the transmittance of the mirror display device 1A toward the driver's seat 5 of a left-hand drive vehicle is slightly lowered than the transmittance toward the driver's seat 4 of the right-hand drive vehicle, but since the difference of the leftward and rightward transmittances is small, the mirror display device 1A has no trouble in practice on the transmittance when it is used for a driver on the driver's seat 5 of a left-hand drive vehicle.

Similarly, in a case where the mirror display device 1A is designed so that the priority transmission direction X1 of the mirror optical element 60 is directed toward the driver's seat 5 of a left-hand drive vehicle in order to give priority to the left-hand drive vehicle, there may be a case where the mirror display device 1A is applied to a right-hand drive vehicle. In such a case, the transmittance of the mirror display device 1A toward the driver's seat 4 of a right-hand drive vehicle is slightly lowered than the transmittance toward the driver's seat 5 of the left-hand drive vehicle, but since the difference of the leftward and rightward transmittances is small, the mirror display device 1A has no trouble in practice on the transmittance when it is used for a driver on the driver's seat 4 of a right-hand drive vehicle.

Figure 6:
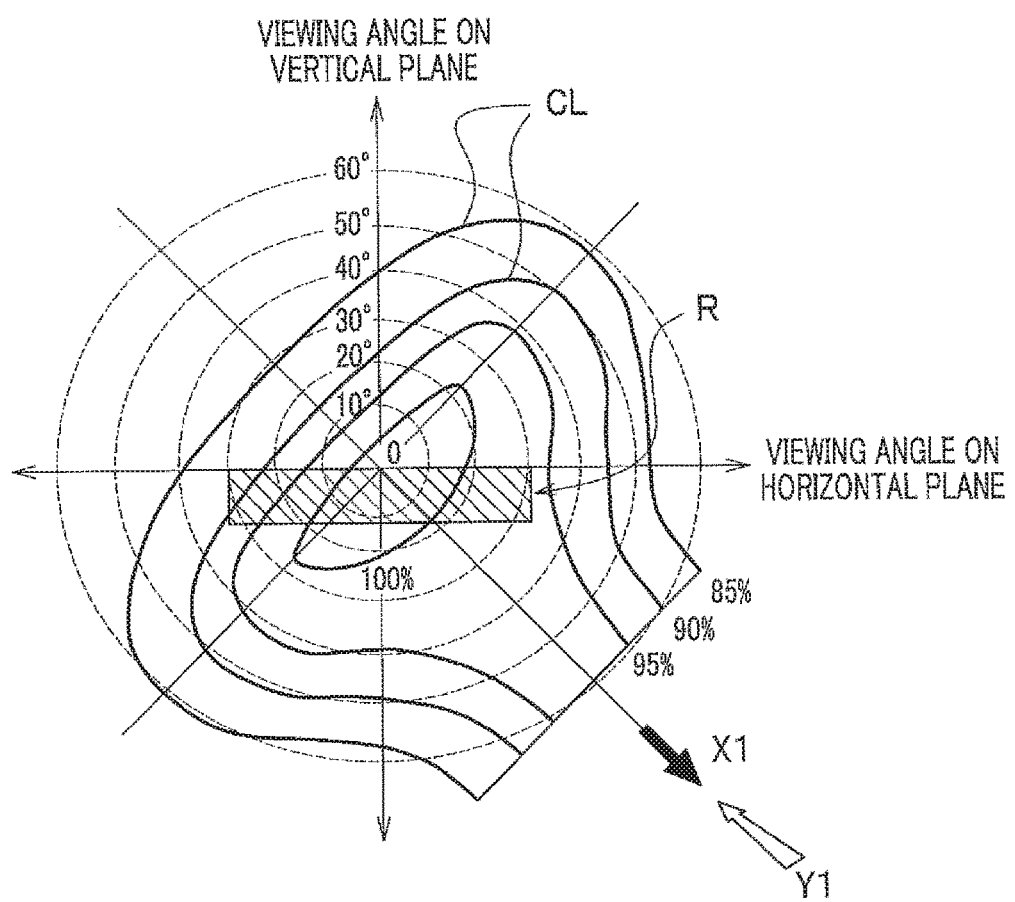
FIG. 6 is a view explaining a simulation result of the transmittance in the image display state of the mirror display device according to the first embodiment of the present invention.

Then, a simulation result of transmittance of the mirror display device 1A according to the first embodiment of the present invention will be explained. As shown in FIG. 6, a visual region R of the mirror display device 1A is putted on contour lines CL of the transmittance at the time of applying voltage to the mirror optical element 60 to display an image from the monitor display element 50. Thus, when the mirror display device 1A is viewed from the priority transmission direction X1 side, it is realized that the visibility of the image displayed on the mirror display device 1A is the best.

Note that, a vertical axis of FIG. 6 expresses a viewing angle on a vertical plane, and a horizontal axis of FIG. 6 expresses a viewing angle on a horizontal plane. For example, "30°" on the vertical axis means that the viewing direction is directed obliquely downward so that an angle between the viewing direction and the horizontal direction is 30 degrees.

That is, as shown in FIG. 7, the priority transmission direction X1 of the mirror optical element 60 is set according to a viewing direction Y1 of a driver P1 being a user. Note that, parallel lines (striped pattern) shown in the mirror display device 1A shown in FIG. 7 show the direction of the light transmission axis of the absorption-type polarization plate 63.

In this embodiment, the mirror display device 1A is provided at the forward and upward position more than the eye point EP of the driver P1. The priority transmission direction X1 of the mirror optical element 60 is set to the direction on the right driver's seat 4 side of the right under direction and the left under direction.

Sunglasses SG which a driver P1 or the like wears includes ones having an anti-dazzle performance due to using polarizing lenses for cutting off the polarized light vibrating in the left-right direction and transmitting the polarized light vibrating in the upper-lower direction. Since the mirror display device 1A is set so that the absorption-type polarization plate 63 transmits the polarized light vibrating in the upper-lower direction and absorbs the polarized light vibrating in the left-right direction, the mirror function and the image display function can be suitably realized also for the driver P1 wearing the sunglasses SG.

The priority transmission direction X1 of the TN type mirror optical element 60 of the mirror display device 1A according to the first embodiment of the present invention is set according to the viewing direction Y1 of the driver P1 being a user. That is, the mirror optical element 60 of the mirror display device 1A whose transmittance differs according to a direction is set in a posture such that the priority transmission direction X1 is set corresponding to the viewing direction Y1 of the driver P1. Hereby, display characteristics of the monitor display element 50 are suitably elicited to make the driver P1 suitably visible when an image is displayed by the monitor display element 50. Furthermore, even in the case where the mirror display device 1A is applied to whichever of a right-hand drive vehicle and a left-hand drive vehicle, the mirror display device 1A displays an image from the monitor display element 50 to make the driver P1 and the driver P2 suitably visible. That is, the common use of the product can be suitably realized for both of a right-hand drive vehicle and a left-hand drive vehicle.

Furthermore, since the mirror display device 1A realizes the reflective state of the mirror optical element 60 without applying voltage, the function as a mirror can be automatically realized when the power source is in an OFF state before and after getting on or off the vehicle, or in a power loss state.

Since the mirror display device 1A is provided at an upper position than the eye point EP of the driver P1 and the priority transmission direction X1 of the mirror optical element 60 is set to be downward, the mirror display device 1A displays an image from the monitor display device 50 to make the driver P1 suitably visible. Furthermore, even in the case where the mirror display device 1A is applied to whichever of a right-hand drive vehicle and a left-hand drive vehicle, the mirror display device 1A displays an image from the monitor display element 50 to make the driver P1 and the driver P2 suitably visible. That is, the common use of the product can be suitably realized for both of a right-hand drive vehicle and a left-hand drive vehicle.

Furthermore, the direction of the priority transmission direction X1 of the mirror display device 1A is set to the right under direction or the left under direction, the mirror display device 1A can be suitably used as a room mirror to be provided in the cabin 2 of the vehicle C.

Since the priority transmission direction X1 of the mirror display device 1A is set to the direction on the driver's seat 4 side of the right under direction and the left under direction, the mirror display device 1A displays an image from the monitor display element 50 to make the driver P1 further suitably visible.

Since the absorption-type polarization plate 63 of the mirror display device 1A transmits the polarized light vibrating in the upper-lower direction and absorbs the polarized light vibrating in the left-right direction, the mirror function and the image display function can be suitably realized even when the driver P1 wears the sunglasses SG.

Second Embodiment

Then, a mirror display device according to a second embodiment of the present invention will be explained mainly on differences with the mirror display device 1A according to the first embodiment.

Figure 8:
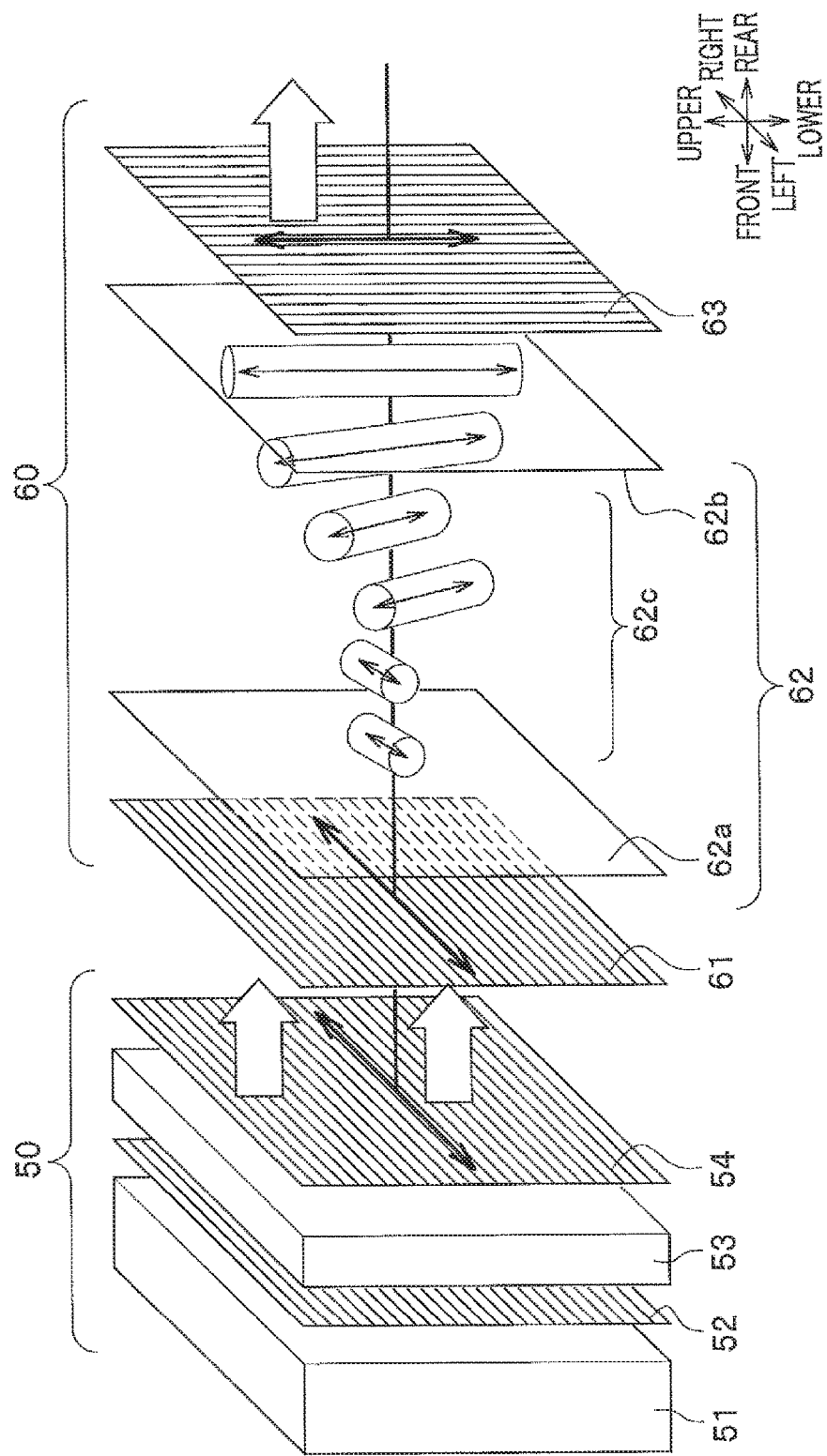
FIG. 8 is a schematic view showing an image display state of a mirror display device according to a second embodiment of the present invention.
Figure 9:
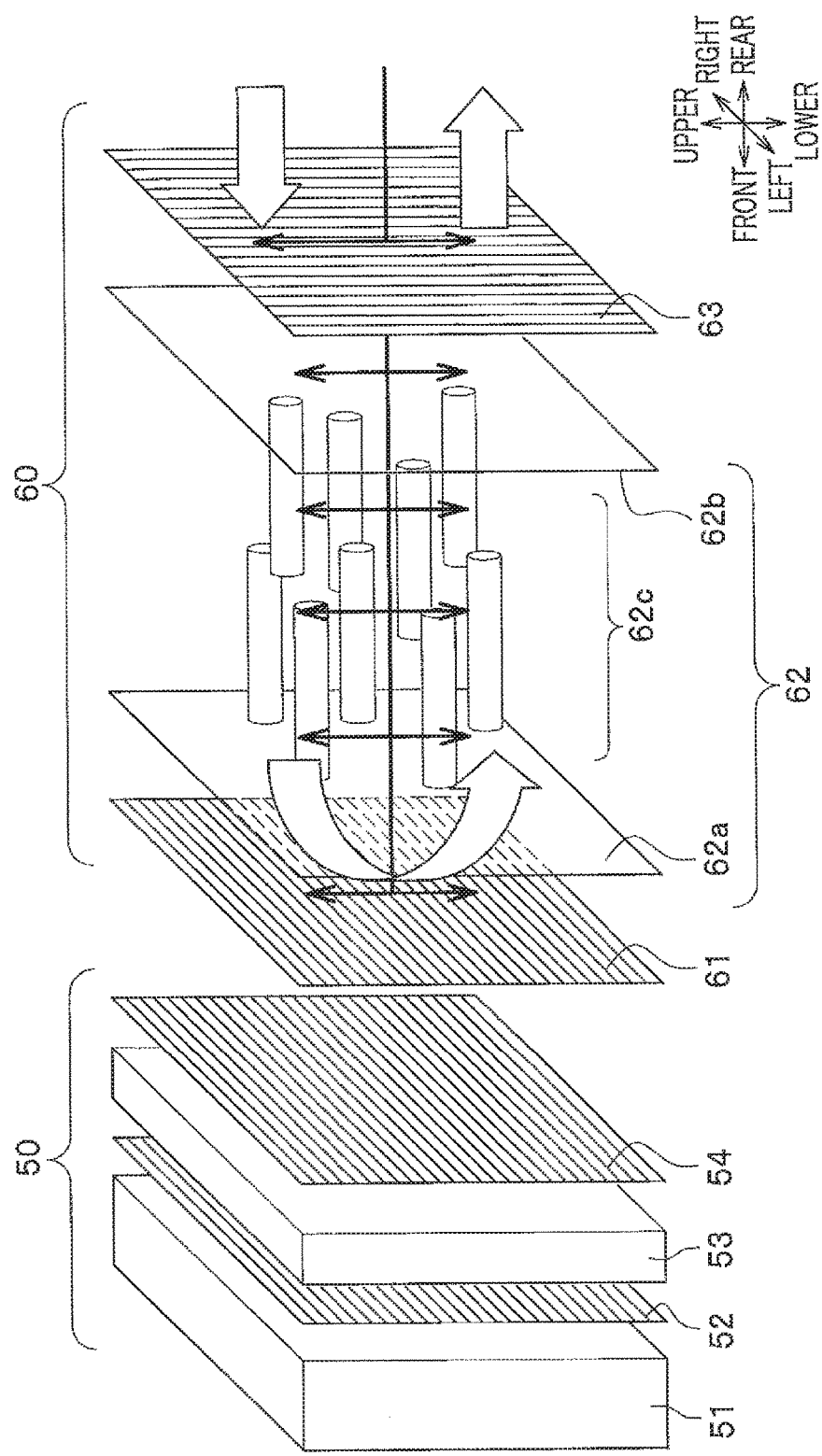
FIG. 9 is a schematic view showing a mirror state of the mirror display device according to the second embodiment of the present invention.

As shown in FIGS. 8, 9, a monitor display element 50 of a mirror display device 1B according to the second embodiment of the present invention is arranged in the posture where the monitor display element 50 according to the first embodiment is rotated clockwise by 90 degrees in a view from the rear. A reflection-type polarization plate 61 of the mirror display device 1B according to the second embodiment of the present invention is arranged in the posture where the reflection-type polarization plate 61 according to the first embodiment is rotated by 90 degrees around an axis along the front-rear direction.

<Switching Reflective State and Transmissible State of Mirror Optical Element>

As shown in FIG. 8, a mirror optical element 60 becomes a transmissible state in a state where the mirror display device 1B is used as a display device (liquid crystal cell 62 is in the voltage-non-applied state). In the transmissible state, the polarized light vibrating in the left-right direction coming from the reflection-type polarization plate 61 side is converted to the polarized light vibrating in the upper-lower direction by the liquid crystal cell 62 to be emitted from the absorption-type polarization plate 63. Furthermore, in the transmissible state, the polarized light vibrating in the upper-lower direction coming from the absorption-type polarization plate 63 side is converted to the polarized light vibrating in the left-right direction by the liquid crystal cell 62 to be emitted forward from the reflection-type polarization plate 61. In the transmissible state, the polarized light vibrating in the upper-lower direction coming from the reflection-type polarization plate 61 side is reflected by the reflection-type polarization plate 61. In the transmissible state, the polarized light vibrating in the left-right direction coming from the absorption-type polarization plate 63 side is absorbed by the absorption-type polarization plate 63.

As shown in FIG. 9, the mirror optical element 60 becomes to be a reflective state when voltage is applied to the liquid crystal cell 62. In the reflective state, the polarized light vibrating in the upper-lower direction coming from the absorption-type polarization plate 63 side is transmitted through the liquid crystal cell 62 as it is (as the polarized light vibrating in the upper-lower direction) to be reflected by the reflection-type polarization plate 61, and is transmitted rearward through the liquid crystal cell 62 as it is to be emitted from the absorption-type polarization plate 63. Furthermore, in the reflective state, the polarized light vibrating in the upper-lower direction coming from the reflection-type polarization plate 61 side is reflected by the reflection-type polarization plate 61. Furthermore, in the reflective state, the polarized light vibrating in the left-right direction coming from the absorption-type polarization plate 63 side is absorbed by the absorption-type polarization plate 63. In the reflective state, the polarized light vibrating in the left-right direction coming from the absorption-type polarization plate 61 side is transmitted through the absorption-type polarization plate 61 to be transmitted through the liquid crystal cell 62, then is absorbed by the absorption-type polarization plate 63. Thus, in the reflective state, the light coming from the reflection-type polarization plate 61 side is not transmitted through the mirror optical element 60 to be emitted rearward. Therefore, in the reflective state, even if the monitor display element 50 emits any image light, the mirror optical element 60 suitably realizes the function as a mirror.

Working Example

Next, a working example of the mirror display device 1B will be explained in order of a mirror state, an image display state.
<Mirror State>
As shown in FIG. 9, in a mirror state, the control circuit board 40 puts out the backlight 51 of the monitor display element 50, does not apply voltage to the liquid crystal cell 53 of the monitor display element 50, and applies voltage to the liquid crystal cell 62 of the mirror optical element 60.

In this state, the polarized light vibrating in the left-right direction of an external light which is incident on the rear surface of the absorption-type polarization plate 63 of the mirror optical element 60 is absorbed by the absorption-type polarization plate 63, and the polarized light vibrating in the upper-lower direction of the external light is transmitted through the absorption-type polarization plate 63. The polarized light vibrating in the upper-lower direction transmitted through the absorption-type polarization plate 63 is transmitted through the liquid crystal cell 62 as it is (as the polarized light vibrating in the upper-lower direction). The polarized light vibrating in the upper-lower direction transmitted through the liquid crystal cell 62 is reflected by the reflection-type polarization plate 61. The light reflected by the reflection-type polarization plate 61 is transmitted rearward through the liquid crystal cell 62 as it is (as the polarized light vibrating in the upper-lower direction). The polarized light vibrating in the upper-lower direction transmitted rearward through the liquid crystal cell 62 is transmitted through the absorption-type polarization plate 63 to be emitted rearward.
<Image Display State>
As shown in FIG. 8, in an image display state, the control circuit board 40 puts on the backlight 51 of the monitor display element 50, applies voltage to the liquid crystal cell 53 of the monitor display element 50, and does not apply voltage to the liquid crystal cell 62 of the mirror optical element 60.

In this state, the polarized light vibrating in the upper-lower direction of the light emitted from the backlight 51 is absorbed by the absorption-type polarization plate 52, and the polarized light vibrating in the left-right direction is transmitted through the absorption-type polarization plate 52. The polarized light vibrating in the left-right direction transmitted through the absorption-type polarization plate 52 is transmitted through the liquid crystal cell 53 as it is (as the polarized light vibrating in the left-right direction). The polarized light vibrating in the left-right direction transmitted through the liquid crystal cell 53 is transmitted through the absorption-type polarization plate 54.

Furthermore, the polarized light vibrating in the left-right direction transmitted through the absorption-type polarization plate 54 is transmitted through the reflection-type polarization plate 61 of the mirror optical element 60. The polarized light vibrating in the left-right direction transmitted through the reflection-type polarization plate 61 is converted to the polarized light vibrating in the upper-lower direction while it is transmitted rearward in the liquid crystal cell 62. The polarized light vibrating in the upper-lower direction converted by the liquid crystal cell 62 is transmitted through the absorption-type polarization plate 63 to be emitted rearward.

The priority transmission direction X1 of the TN type mirror optical element 60 of the mirror display device 1B according to the second embodiment of the present invention is set according to the viewing direction Y1 of the driver P1 being a user. That is, the mirror optical element 60 of the mirror display device 1B whose transmittance differs according to a direction is set in a posture such that the priority transmission direction X1 is set corresponding to the viewing direction Y1 of the driver P1. Hereby, the display characteristics of the monitor display element 50 are suitably elicited to make the driver P1 suitably visible when an image is displayed by the monitor display element 50. Furthermore, even in the case where the mirror display device 1B is applied to whichever of a right-hand drive vehicle and a left-hand drive vehicle, the mirror display device 1B displays an image from the monitor display element 50 to make the driver P1 and the driver P2 suitably visible. That is, the common use of the product can be suitably realized for a right-hand drive vehicle and a left-hand drive vehicle.

Third Embodiment

Next, a mirror display device according to a third embodiment of the present invention will be explained mainly on differences with the mirror display device 1A according to the first embodiment.

Figure 10:
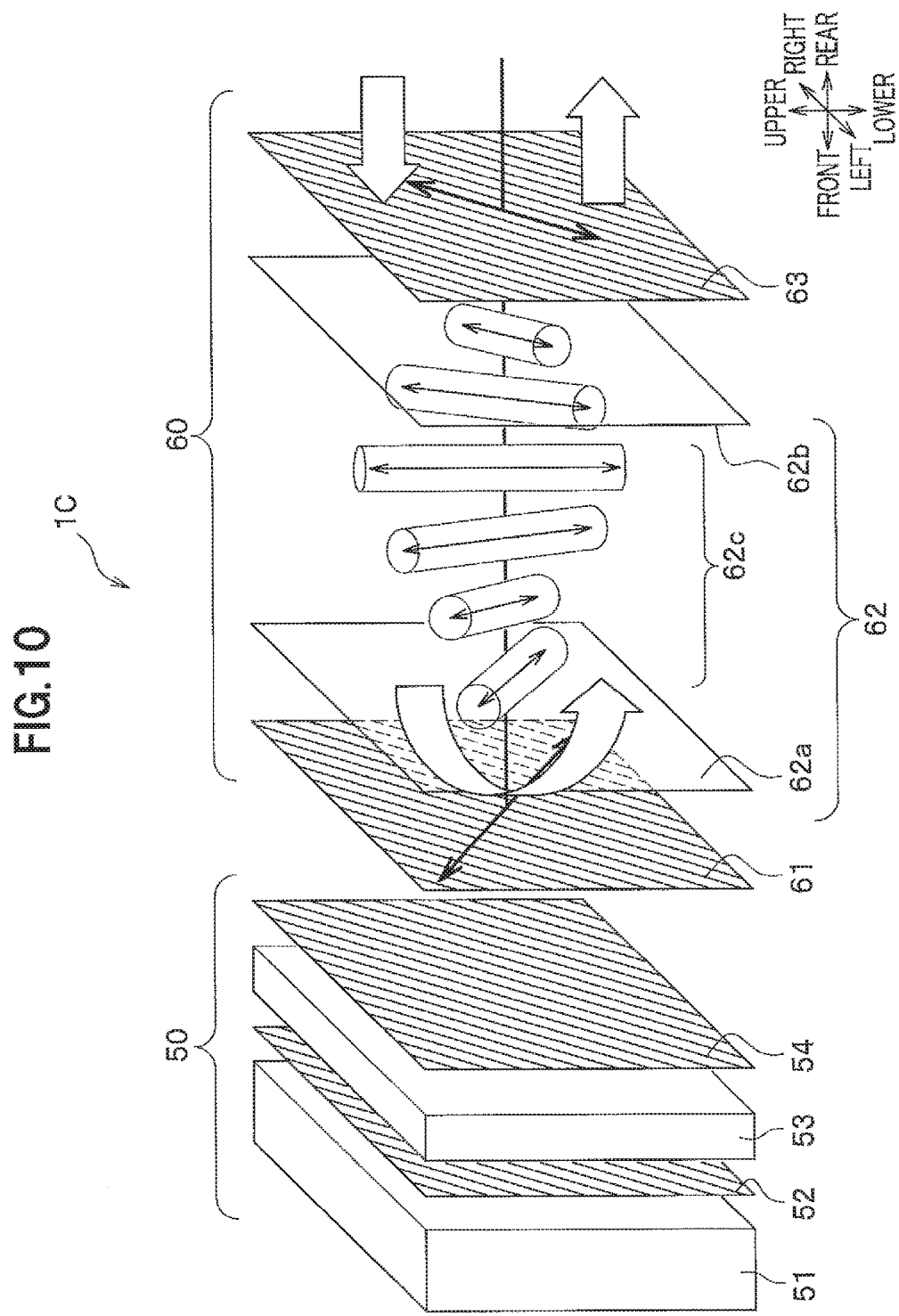
FIG. 10 is a schematic view showing a mirror state of a mirror display device according to a third embodiment of the present invention.
Figure 11:
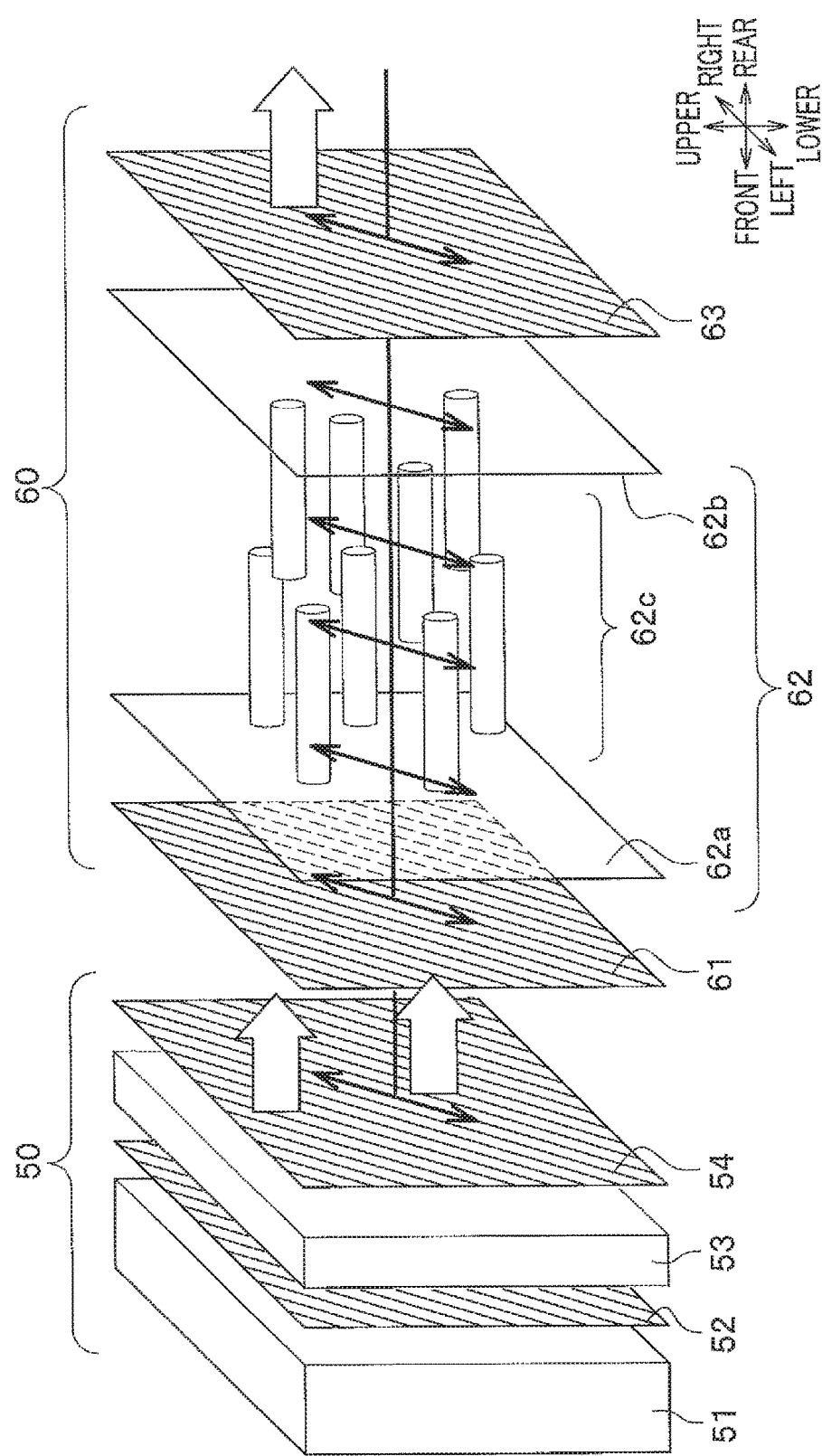
FIG. 11 is a schematic view showing an image display state of the mirror display device according to the third embodiment of the present invention.

As shown in FIGS. 10, 11, a monitor display element 50 and a mirror optical element 60 of a mirror display device 1C according to the third embodiment of the present invention are arranged in the postures where the monitor display element 50 and the mirror optical element 60 according to the first embodiment are rotated clockwise by 45 degrees in a view from the rear, respectively. That is, the direction of the light transmission axis of each polarization plate 52, 54, 61, 63 is set to an oblique direction (an inclination direction of 45 degrees relative to the vertical axis) extending from the lower left to the upper right. Liquid crystal cells 53, 62 are also set corresponding to the above-said direction of the light transmission axis.

Figure 12:
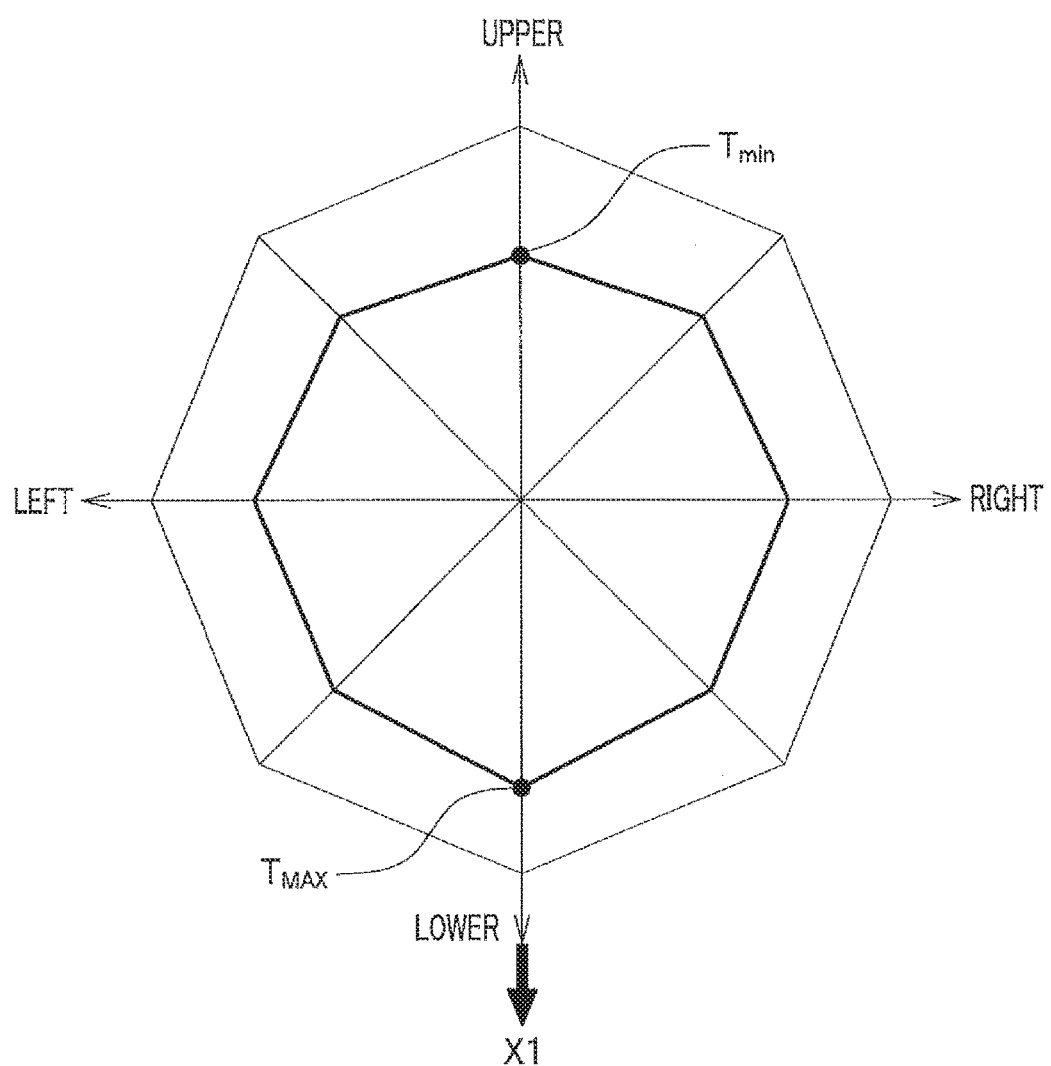
FIG. 12 is a view explaining transmittance of a mirror optical element according to the third embodiment of the present invention.

As shown in FIG. 12, the priority transmission direction X1 of the mirror optical element 60 of the mirror display device 1C according to the third embodiment of the present invention is set to the vertical direction directed downward.

Figure 13:
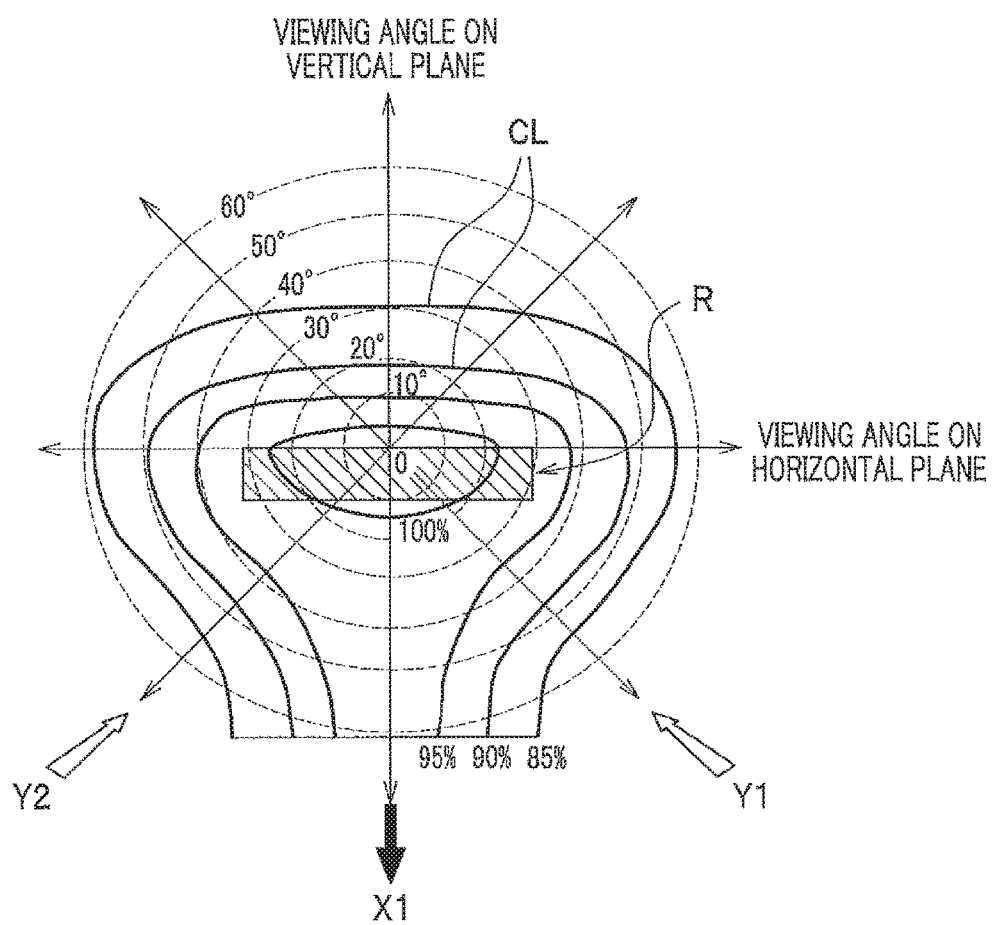
FIG. 13 is a view explaining a simulation result of the transmittance in the image display state of the mirror display device according to the third embodiment of the present invention.

Then, a simulation result of transmittance of the mirror display device 1C according to the third embodiment of the present invention will be explained. As shown in FIG. 13, a visual region R of the mirror display device 1C is putted on contour lines CL of the transmittance at the time of applying voltage to the mirror optical element 60 to display an image from the monitor display element 50. Thus, when the mirror display device 1C is viewed from the priority transmission direction X1 side, it is realized that the visibility of image displayed on the mirror display device 1C is the best.

Figure 14:
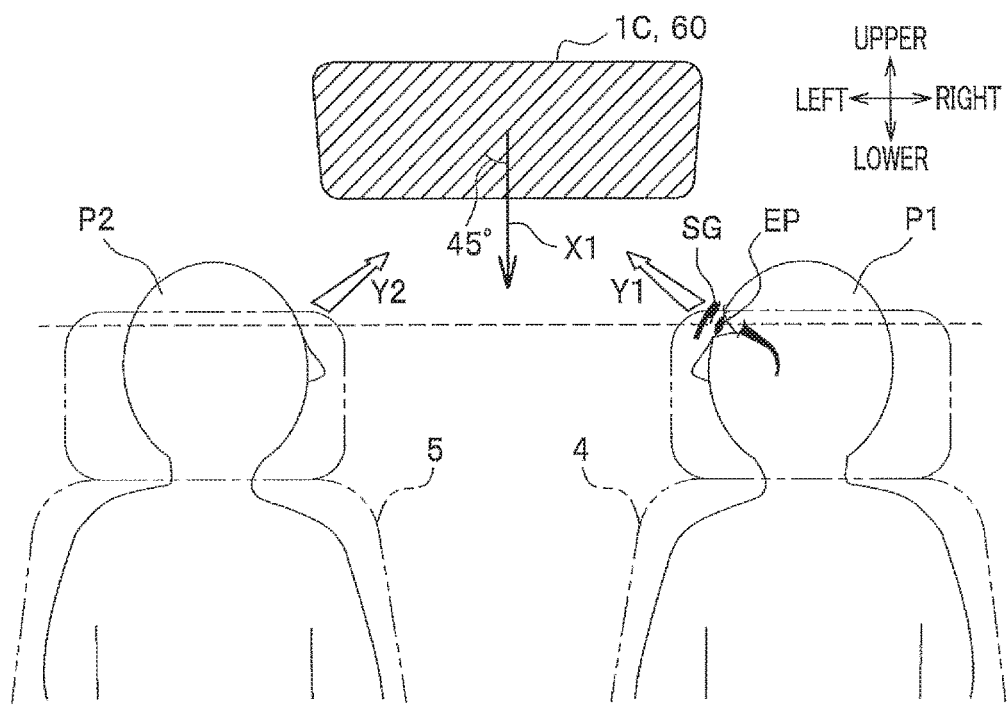
FIG. 14 is a view showing a relation between a viewing direction and a priority transmission direction in the mirror display device according to the third embodiment of the present invention.

That is, as shown in FIG. 14, the priority transmission direction X1 of the mirror optical element 60 is set corresponding to the viewing direction Y1 of the driver P1 being a user. Note that, parallel lines (striped pattern) shown in the mirror display device 1C shown in FIG. 14 show the direction of the light transmission axis of the absorption-type polarization plate 63.

In this embodiment, the mirror display device 1C is provided at the forward and upward position more than the eye point EP of the driver P1. The priority transmission direction X1 of the mirror optical element 60 is set to the vertical direction directed downward. In this case, the viewing direction Y1 of the driver P1 on the driver's seat 4 of a right-hand drive vehicle and the viewing direction Y2 of the driver P2 on the driver's seat 5 of a left-hand drive vehicle differ from the priority transmission direction X1. However, the mirror display device 1C has a small difference of transmittances in the priority transmission direction X1 and in the viewing direction Y1 of the driver P1 of a right-hand drive vehicle, and has also a small difference of transmittances in the priority transmission direction X1 and in the viewing direction Y2 of the driver P2 of a left-hand drive vehicle. As the result, transmittances in the direction Y1 and in the direction Y2 are similar to each other due to symmetric transmittance characteristics. Therefore, it is realized that the mirror display device 1C can provide an image with a high visibility for both drivers P1, P2 of a right-hand drive vehicle and a left-hand drive vehicle.

Since the priority transmission direction X1 of the mirror display device 1C according to the third embodiment of the present invention is set to the vertical direction directed downward, transmittances on the left side and the right side are similar to each other. Therefore, even in the case where the mirror display device 1C is applied to whichever of a right-hand drive vehicle and a left-hand drive vehicle, the mirror display device 1C displays an image from the monitor display element 50 to make the driver P1 and the driver P2 suitably visible. Consequently, the common use of the product can be suitably realized for a right-hand drive vehicle and a left-hand drive vehicle.

Fourth Embodiment

Next, a mirror display device according to a fourth embodiment of the present invention will be explained mainly on differences with the mirror display device 1B according to the second embodiment.

Figure 15:
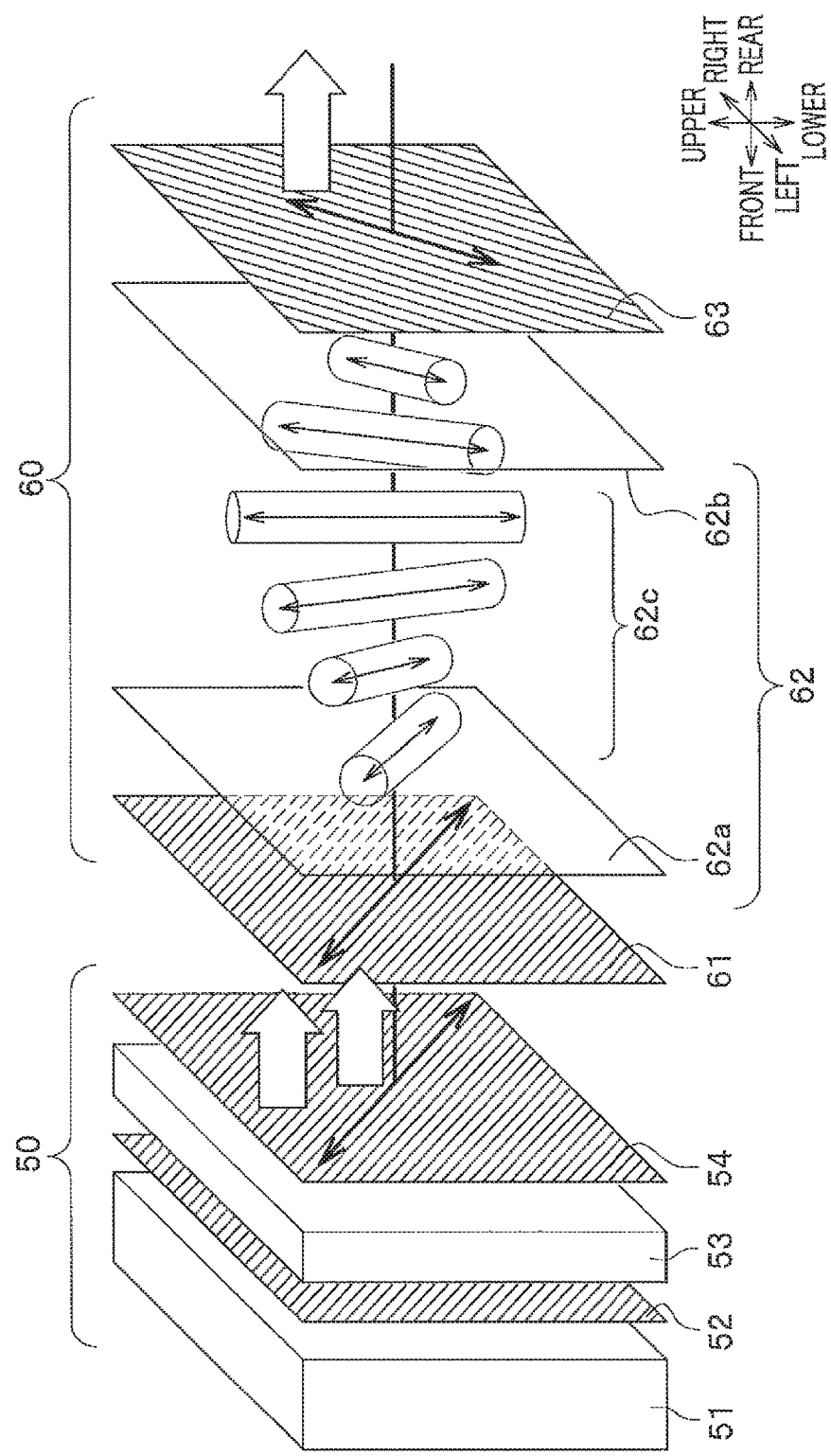
FIG. 15 is a schematic view showing an image display state of a mirror display device according to a fourth embodiment of the present invention.
Figure 16:
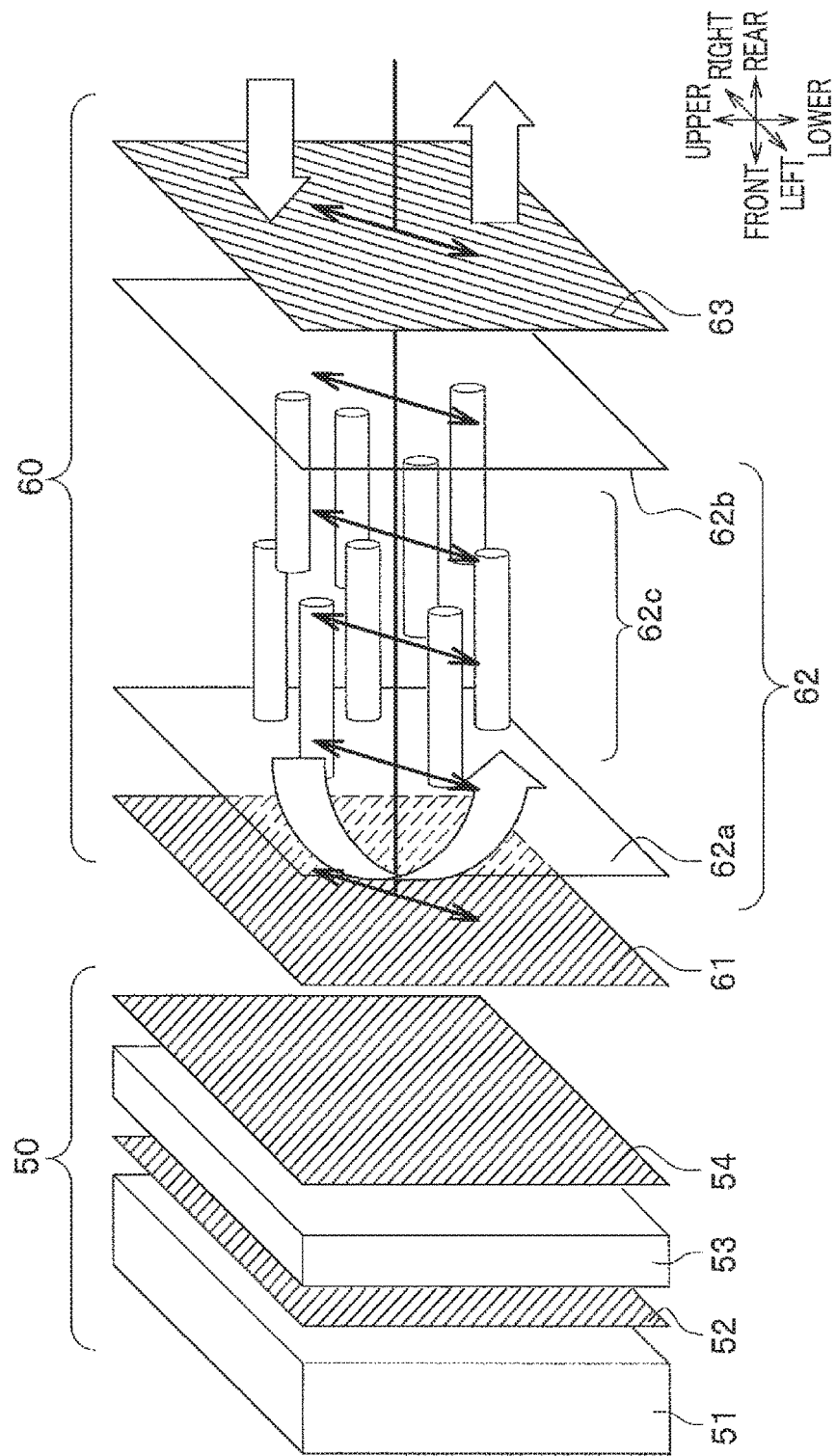
FIG. 16 is a schematic view showing a mirror state of the mirror display device according to the fourth embodiment of the present invention.

As shown in FIGS. 15, 16, a monitor display element 50 and a mirror optical element 60 of a mirror display device 1D according to the fourth embodiment of the present invention are arranged in postures where the monitor display element 50 and the mirror optical element 60 according to the second embodiment are rotated clockwise by 45 degrees in a view from the rear, respectively. That is, the direction of the light transmission axis of each polarization plate 52, 54, 61 is set to an oblique direction (an inclination of 45 degrees relative to the vertical axis) extending from the lower right to the upper left. And the direction of the light transmission axis of the polarization plate 63 is set to an oblique direction (an inclination of 45 degrees relative to the vertical axis) extending from the lower left to the upper right. The liquid crystal cells 53, 62 are also set to be corresponding to the above-said directions of the light transmission axes.

The priority transmission direction X1 of the mirror optical element 60 of the mirror display device 1D according to the fourth embodiment of the present invention is set to the vertical direction directed downward (refer to FIG. 12) like the mirror display device 1C according to the third embodiment.

Since the priority transmission direction X1 of the mirror display device 1D according to the fourth embodiment of the present invention is set to the vertical direction directed downward, transmittances on the left side and the right side are similar to each other. Therefore, even in the case where the mirror display device 1D is applied to whichever of a right-hand drive vehicle and a left-hand drive vehicle, the mirror display device 1D displays an image from the monitor display element 50 to make both of the driver P1 and the driver P2 suitably visible. Consequently, the common use of the product can be suitably realized for a right-hand drive vehicle and a left-hand drive vehicle.

In the above, the embodiments of the present invention are explained. However, the present invention is not limited to the embodiments, and can be suitably modified without deviating from the gist of the present invention. For example, the installation location of the mirror display device 1A, 1B, 1C, or 1D which is used as a room mirror of the vehicle C is not limited to the middle area (an area between the driver's sheet 4 and the assistant driver's seat 5 in the vehicle's width direction) of the front window shield 3 in the vehicle's width direction. Furthermore, the mirror display device 1A, 1B, 1C, or 1D which is used as a room mirror of the vehicle C may have the structure hanging down from the front end part of the ceiling of the cabin 2 of the vehicle C.

Furthermore, the mirror display device 1A, 1B, 1C, or 1D may be constituted so that a mirror state and an image display state are switched as the whole of the device. And the mirror display device 1A, 1B, 1C, or 1D may be also constituted so that the display surface of the device is divided into the three of the left part, the middle part and the right part, and that the middle part is used always as a mirror state and the left part and the right part are used to be switched between a mirror state and an image display state.

The mirror display device of the present invention is not limited to a room mirror of the vehicle C, and can be applied to a monitor device installed on the instrument panel or the like of the vehicle C, and to a smart phone or the like except installing in the vehicle C. In the case where the mirror display device of the present invention is applied to things except a room mirror of the vehicle C, the priority transmission direction of the mirror optical element can be set according to a viewing direction of the user.

That is, in the case where the mirror display device is provided above the eyes of the user, the priority transmission direction of the mirror optical element may be set to be directed downward (downward than the horizontal direction) according to the viewing direction of the user.

Furthermore, in the case where the mirror display device is provided below the eyes of the user, the priority transmission direction of the mirror optical element may be set to be directed upward (upward than the horizontal direction) according to the viewing direction of the user.

DESCRIPTION OF REFERENCE SYMBOLS 1A, 1B, 1C, 1D Mirror display device
2 Cabin
3 Front window shield
4 Driver's sheet (of right-hand drive vehicle)

5 Driver's sheet of left-hand drive vehicle (Assistant driver's sheet of right-hand drive vehicle)
50 Monitor display element
60 Mirror optical element
61 Reflection-type polarization plate
62 Liquid crystal cell
63 Absorption-type polarization plate
C Vehicle
P1 Driver (of right-hand drive vehicle)
P2 Driver (of left-hand drive vehicle)

What is claimed is:

1. A mirror display device comprising:
a monitor display element for emitting polarized light which is image polarized light vibrating in a first direction in an image display state; and
a mirror optical element including:
    a reflection-type polarization plate for transmitting the polarized light vibrating in the first direction and reflecting polarized light vibrating in a second direction orthogonal to the first direction, the reflection-type polarization plate being provided on a display surface side of the mirror display device relative to the monitor display element;
    an absorption-type polarization plate for transmitting the polarized light vibrating in the first direction and absorbing the polarized light vibrating in the second direction, the absorption-type polarization plate being provided on the display surface side relative to the reflection-type polarization plate; and
    a liquid crystal cell provided between the reflection-type polarization plate and the absorption-type polarization plate,
wherein the mirror optical element is configured to be capable of switching a reflective state and a transmissible state, the reflective state being a state in which the polarized light vibrating in the first direction coming from a side of the absorption-type polarization plate is converted to the polarized light vibrating in the second direction by the liquid crystal cell to be reflected by the reflection-type polarization plate and converted to vibrate in the first direction by the liquid crystal cell to be emitted from the absorption-type polarization plate, and the transmissible state being a state in which the polarized light vibrating in the first direction coming from a side of the reflection-type polarization plate transmits through the liquid crystal cell while vibrating in the first direction to be emitted from the absorption-type polarization plate, and
wherein a priority transmission direction of the mirror optical element is set according to a viewing direction of a user.

2. The mirror display device according to claim 1,
wherein the mirror display device is provided above an eye point of a driver in a vehicle, and
wherein the priority transmission direction is set to be directed downward.

3. The mirror display device according to claim 2,
wherein the priority transmission direction is set to a lower right direction or a lower left direction.

4. The mirror display device according to claim 3,
wherein the priority transmission direction is set to a direction on a driver's sheet side of the lower right direction and the lower left direction.

5. The mirror display device according to claim 4,
wherein the absorption-type polarization plate is set to absorb polarized light vibrating in a left-right direction and transmit polarized light vibrating in an upper-lower direction.

6. The mirror display device according to claim 3,
wherein the absorption-type polarization plate is set to absorb polarized light vibrating in a left-right direction and transmit polarized light vibrating in an upper-lower direction.

7. The mirror display device according to claim 2,
wherein the priority transmission direction is set to a vertical direction directed downward.

8. A mirror display device comprising:
a monitor display element for emitting polarized light which is image polarized light vibrating in a first direction in an image display state; and
a mirror optical element including:
    a reflection-type polarization plate for transmitting the polarized light vibrating in the first direction and reflecting polarized light vibrating in a second direction orthogonal to the first direction, the reflection-type polarization plate being provided on a display surface side of the mirror display device relative to the monitor display element;
    an absorption-type polarization plate for transmitting the polarized light vibrating in the second direction and absorbing the polarized light vibrating in the first direction, the absorption-type polarization plate being provided on the display surface side relative to the reflection-type polarization plate; and
    a liquid crystal cell provided between the reflection-type polarization plate and the absorption-type polarization plate,
wherein the mirror optical element is configured to be capable of switching a reflective state and a transmissible state, the reflective state being a state in which the polarized light vibrating in the second direction coming from a side of the absorption-type polarization plate transmits through the liquid crystal cell while vibrating in the second direction to be reflected from the reflection-type polarization plate, and the transmissible state being a state in which the polarized light vibrating in the first direction coming from a side of the reflection-type polarization plate is converted to vibrate in the second direction by the liquid crystal cell to be emitted from the absorption-type polarization plate, and
wherein a priority transmission direction of the mirror optical element is set according to a viewing direction of a user.

9. The mirror display device according to claim 8,
wherein the mirror display device is provided above an eye point of a driver in a vehicle, and
wherein the priority transmission direction is set to be directed downward.

10. The mirror display device according to claim 9,
wherein the priority transmission direction is set to a lower right direction or a lower left direction.

11. The mirror display device according to claim 10,
wherein the priority transmission direction is set to a direction on a driver's sheet side of the lower right direction and the lower left direction.

12. The mirror display device according to claim 11,
wherein the absorption-type polarization plate is set to absorb polarized light vibrating in a left-right direction and transmit polarized light vibrating in an upper-lower direction.

13. The mirror display device according to claim 10,
wherein the absorption-type polarization plate is set to absorb polarized light vibrating in a left-right direction and transmit polarized light vibrating in an upper-lower direction.

14. The mirror display device according to claim 9,
wherein the priority transmission direction is set to a vertical direction directed downward.

\* \* \* \* \*

UNITED STATES PATENT AND TRADEMARK OFFICE
CERTIFICATE OF CORRECTION

PATENT NO. : 10,259,393 B2
APPLICATION NO. : 15/982233
DATED : April 16, 2019
INVENTOR(S) : Y. Gohara Page 1 of 1

It is certified that error appears in the above-identified patent and that said Letters Patent is hereby corrected as shown below:

In the Claims

At Column 17, Line 66 (Claim 4, Line 3), please change "sheet" to -- seat --.
At Column 18, Line 61 (Claim 11, Line 3), please change "sheet" to -- seat --.

Signed and Sealed this
Seventh Day of April, 2020

Andrei Iancu
*Director of the United States Patent and Trademark Office*